US012699778B2

(12) United States Patent
Balles et al.

(10) Patent No.: US 12,699,778 B2
(45) Date of Patent: Aug. 4, 2026

(54) RISK SCORING USING SUPERVISED MACHINE LEARNING

(71) Applicant: CrowdStrike, Inc., Sunnyvale, CA (US)

(72) Inventors: Christopher Balles, San Diego, CA (US); Kellen Arb, Austin, TX (US); Michael Cosmadelis, Mount Laurel, NJ (US); Sean Corlin, Upland, CA (US); Jeremy Fintel, Austin, TX (US)

(73) Assignee: CrowdStrike, Inc., Sunnyvale, CA (US)

( * ) Notice: Subject to any disclaimer, the term of this patent is extended or adjusted under 35 U.S.C. 154(b) by 150 days.

(21) Appl. No.: 18/516,593

(22) Filed: Nov. 21, 2023

(65) Prior Publication Data

US 2025/0165611 A1     May 22, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 11,321,467 B2 * | 5/2022 | Wang | | H04L 63/1433 |
| 11,503,061 B1 * | 11/2022 | Lin | | H04L 63/102 |
| 11,677,773 B2 * | 6/2023 | Iyer | | H04L 63/164 |
| | | | | 726/25 |
| 2012/0233656 A1 * | 9/2012 | Rieschick | | H04L 63/1441 |
| | | | | 726/1 |
| 2016/0173521 A1 * | 6/2016 | Yampolskiy | | G06Q 10/06393 |
| | | | | 726/25 |
| 2018/0139227 A1 * | 5/2018 | Martin | | H04L 63/1433 |
| 2019/0052664 A1 * | 2/2019 | Kibler | | G06F 11/301 |
| 2020/0137101 A1 * | 4/2020 | Scott | | G06F 21/577 |
| 2020/0210899 A1 * | 7/2020 | Guo | | G06Q 20/4016 |
| 2021/0075767 A1 * | 3/2021 | Jain | | H04W 36/0044 |
| 2022/0405397 A1 * | 12/2022 | Golan | | G06F 21/57 |
| 2023/0216891 A1 * | 7/2023 | Paulchell | | H04L 63/1433 |
| | | | | 726/1 |
| 2023/0281315 A1 * | 9/2023 | Capellman | | G06F 21/577 |
| | | | | 726/25 |
| 2023/0388332 A1 * | 11/2023 | Cunningham | | G06F 21/552 |

* cited by examiner

*Primary Examiner* — Kaveh Abrishamkar
(74) *Attorney, Agent, or Firm* — Lee & Hayes, P.C.

(57) ABSTRACT

Techniques for using supervised machine learning to train risk models used to analyze group data for security risks are discussed herein. A system can receive a user input identifying risk values associated with categories or attributes of a group having access to computing resources. The system can use the risk model to generate a risk score for the group. The risk score can be used to further analyze aspects of the group or provide recommendations to reduce or eliminate security risks.

20 Claims, 5 Drawing Sheets

EXAMPLE PROCESS:
• RECEIVE RISK VALUE INPUTS
• TRAIN RISK MODEL USING SUPERVISED MACHINE LEARNING FROM RISK VALUE INPUTS AND TEST DATA
• RECEIVE A RISK EVALUATION REQUEST
• RECEIVE GROUP DATA
• GENERATE A RISK VALUE
• GENERATE A RECOMMENDATION

300

400

RECEIVE RISK EVALUATION REQUEST
402

DETERMINE RISK MODEL TO APPLY BASED ON INFORMATION IN RISK
EVALUATION REQUEST
404

APPLY RISK MODEL TO GROUP DATA ASSOCIATED WITH THE RISK EVALUATION
REQUEST
406

GENERATE A RISK SCORE USING THE RISK MODEL
408

OUTPUT THE RISK SCORES FOR THE OBJECTS IN THE GROUP ASSOCIATED WITH
THE RISK EVALUATION REQUEST
410

RISK SCORING USING SUPERVISED MACHINE LEARNING

BACKGROUND

Distributed computing services that can be provided by computing resource providers over the Internet are increasingly being utilized to augment and/or supplant on-premises computing resources. These distributed computing services often provide a scalable and flexible solution for users. Because the platform being provided by the distributed computing service needs to service a wide range of user-types, the resources provided need to be done in an environment suited for those wide range of user-types. However, because of the need for flexibility and expansiveness of offerings to meet the needs of those user-types, security risks are often difficult to detect and analyze. Along with previously established procedural rules, new rules may be added on an ad hoc basis, further exacerbating the difficulty in detecting security risks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
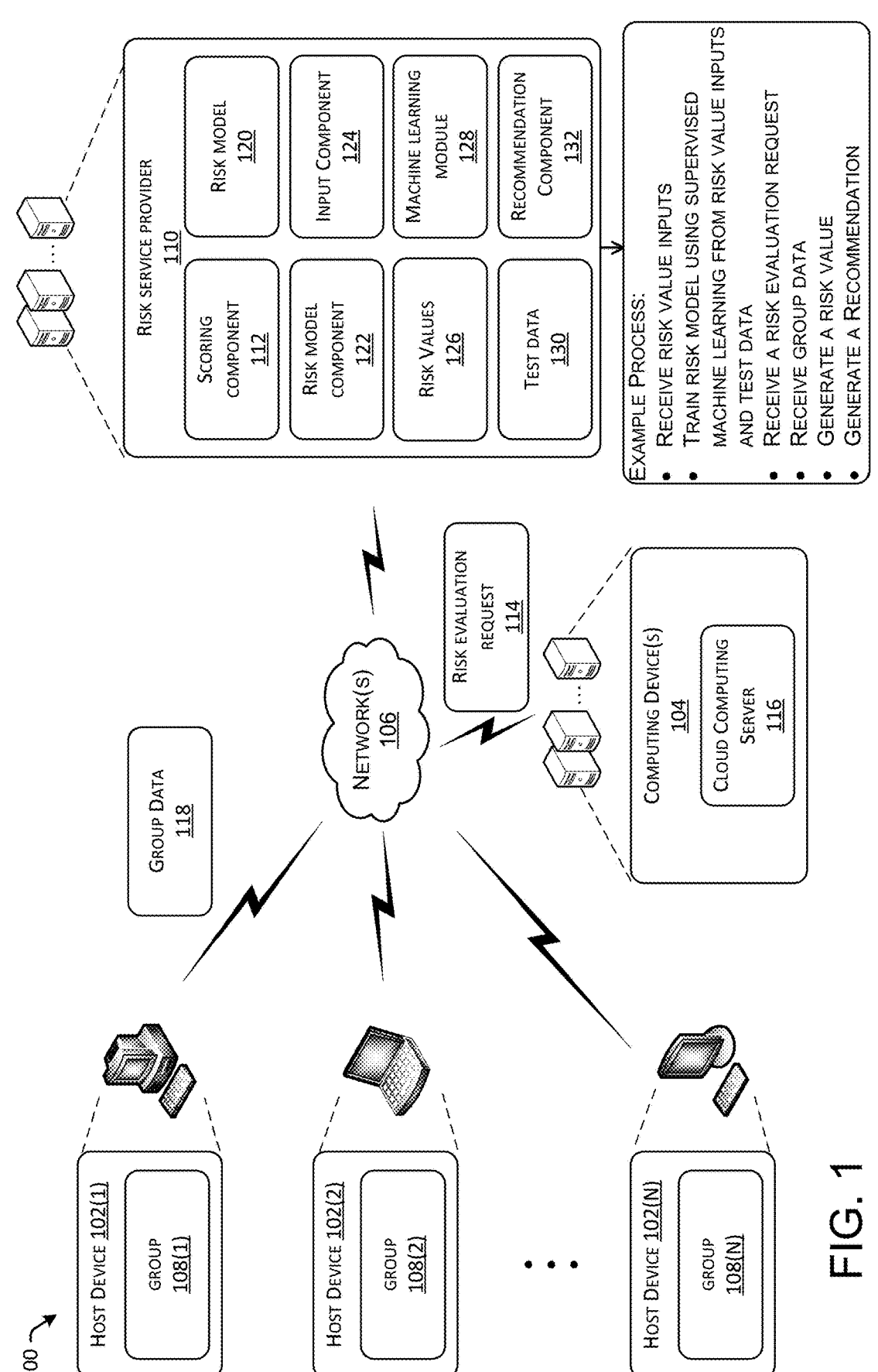
FIG. 1 illustrates an example block diagram of an example computer architecture for generating a risk score of objects of a group to identify potential security risks, as described herein.

This application describes techniques for risk scoring of resource access using one or more risk models built by supervised machine learning. The techniques can include a system implementing one or more components that provide a risk score to one or more groups associated with an enterprise network. The group can be various types of groups having various functions including, but not limited to, an object, a collection of user accounts, computer accounts, and other groups. For example, in an enterprise network serviced by a "cloud platform," the group may be a security group associated with a virtual firewall that controls inbound and outbound traffic to or from a particular entity. In another example, the group may be roles in an organization that can be associated with one or more users or objects. In a still further example, the "group" may be associated with an identity and access management system whereby an individual, entity, and the like are granted specific permissions or rights. In still further examples, the objects may include Amazon Web Services (AWS®) provided by Amazon Technologies, Inc., including, but not limited to, Identity and Access Management (IAM), Security Groups, and Elastic Cloud Computing (ECC).

In some examples of the presently disclosed subject matter, various functional aspects or capabilities ("group attributes") are identified to deconstruct the group into group attributes, and thereafter, deconstruct those group attributes into attribute categories. For example, the group attributes of a security group may be one or more rules that control traffic flow associated with the security group. In another example, the group attributes of roles in an organization may be specific roles, with each role being used to permit or exclude different capabilities. Once broken down into group attributes, the group attributes are deconstructed into one or more attribute categories for the specific group attribute. The attribute categories are used to identify various capabilities or functions associated with the specific group attribute. In some examples, the attribute categories are identified by the potential effect the function or capability may have on the network.

For example, capabilities or functions that if acted upon or used by an unauthorized user or entity has a low risk of causing issues with the network may be grouped together under an attribute category associated with low-risk functions or capabilities. In a similar manner, capabilities or functions that if acted upon or used by an unauthorized user or entity has a high risk of causing issues with the network may be grouped together under an attribute category associated with high-risk functions or capabilities. The presently disclosed subject matter is not limited to using risk as a means for create the attribute categories, as the attribute categories maybe categorizes in various manners.

For example, in a security group, a group attribute may be PROTOCOL, and the attribute categories may be ANY, ICMP, TCP, and UDP, identifying the various types of communication protocols that may be used. In another example in which the group are various roles, the group attribute may be the role, and the group category may be one or more capabilities given to a user or object if assigned that role. For example, in a group consisting of roles, the group attribute may be ALL RESOURCES, and the group category may be, ALL RESOURCES. In this example, the role assigned the user or object is ALL RESOURCES, and the group category indicates that this role has the capability of using all resources available in the network.

In some examples, a risk associated with a group is generated by evaluating the group against one or more risk models. The risk models are generated by initially identifying the group attributes and the group categories. A risk value is assigned to one or more of the group attributes and the group categories, or group risk values. In some examples, the risk value can be a numerical value, with the magnitude of the value representing a relative degree of risk. For example, a risk value can be a value from 0 representing a low risk to 1 representing a high risk. Other values may be used and are considered to be within the scope of the presently disclosed subject matter. The risk values entered may be received from a user input or may be received from other sources such as previously assigned risk values to similar group attributes or group categories.

The group risk values are entered into a supervised machine learning module to generate a risk model output. The risk model output is further refined by an input to train the risk model to generate a value within an expected predetermined value. For example, once the risk model is initially generated using the supervised machine learning module, the risk model may be applied to test data to determine if the risk model output, representing the risk value of the group, is within an expected value range.

If the risk model output is within an expected value range, the risk model is thereafter applied to the group. If the risk model output is not within an expected value range, then the risk values are adjusted. The risk model is reapplied to the test date to determine if the risk value generated by the risk model is within an expected value range. If the risk model output is within an expected value range, the risk model is thereafter applied to the group. It should be understood that more than one risk model may be generated and trained and may be applied to the same group.

An example of the risk generation process is provided in the following example. In the present example, a group (object) is identified as a security group. The security group in the present example has the following group attributes: Protocol and IP Type. The Protocol group attribute identifies the types of traffic (attribute categories) that may be inbound or outbound messages such as internet control message protocol, transmission control protocol, user datagram protocol, and any protocol. The IP Type categories can be all_internal, any, internal_group, local, many_external, many internal, one_external, single internal. As noted above, an initial process is to generate a risk model to which objects (or users, etc.) in this security group are to be evaluated for risk. An input is received assigning a risk value to each of the attribute categories to generate an initial risk model using a supervised machine learning module.

Test data representing simulated objects of the security group are entered into the initial risk model and a risk value is generated. The risk value may be generated using various algorithms, an example, of which is a neural network regression algorithm, although other types of regression algorithms may be used and are considered to be within the scope of the presently disclosed subject matter. The risk value generated using the risk model is evaluated against an expected value range. If the risk value is within the expected value range, the risk model is accepted and applied to actual data of object in the group. If the risk value is not within the expected value range, the risk model is retrained using the machine learning algorithm until the risk value is within the expected value range.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example block diagram 100 of an example computer architecture for generating a risk score of objects of a group to identify potential security risks, as described herein. The diagram 100 may include one or more host device(s) 102(1), 102(2), . . . , 102(N) (individually and/or collectively referred to herein with reference 102), where N is any integer greater than or equal to 1, that interact with host device(s) 104 of a system (e.g., a service system, a security system or a combination thereof) over a network(s) 106. In various examples, the system may be associated with a cloud-based service network that is configured to implement aspects of the functionality described herein.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 104 communicate over the network(s) 106 using a secure protocol (e.g., https) and/or any other protocol or set of protocols, such as the transmission control protocol/Internet protocol (TCP/IP).

The host device 102 (also referred to as "host computing device," "host device," or "monitored computing device") may implement one or more groups 108(1), 108(2), . . . , 108(N) (individually and/or collectively referred to herein with reference 108, where N is any integer greater than or equal to 1), which is stored in memory of the host device 102 and executable by one or more processors of the host device 102. The host device(s) 102 may be or include any suitable type of host devices 102, including, without limitation, a mainframe, a work station, a personal computer (PC), a laptop computer, a tablet computer, a personal digital assistant (PDA), a cellular phone, a media center, an embedded system, a robotic device, a vehicle, a Machine to Machine device (M2M), an unmanned aerial vehicle (UAV), an Internet of Things (IoT), or any other type of device or devices capable of communicating via an instance of the group 108. The group 108 can be various types of users, entities, computing systems, and the like, that are assigned permissions, capabilities, or functions including, but not limited to, an object, a collection of user accounts, computer accounts, and other groups.

An entity may be associated with the host devices 102, and the entity (e.g., user, computing device, organization, or the like) may have registered for security services provided by a risk service provider 110. The risk service provider 110 may provide risk scoring services for the computing device(s) 102 that service the host device(s) 102, may be a functional part of the computing device(s) 104, or may provide risk scoring services directly to the host devices 102. Thus, in some examples, the risk service provider 110 can receive risk scoring requests from the computing device(s) 104 and/or from the host devices 102. In some examples, the risk scoring services provided by the risk service provider 110 may be offered as a service to evaluate security risks associated with various group(s) 108.

In some examples, the risk service provider 110 includes a scoring component 112. The scoring component 112 is executed when one of the host device(s) 102 or the computing device(s) 104 transmits a risk evaluation request 114 to the risk service provider 110. In the example illustrated in FIG. 1, a cloud computing server 116 of the computing device(s) 104 transmitted the risk evaluation request 114 to the risk service provider 110 to evaluate a risk associated with the group 108(1) of the host device 102(1). The cloud computing server 116 can be one or more computing devices that provide cloud computing services to the host device(s) 102. It should be understood that the cloud computing server 116 may be more than one server and may be scalable to have different computing resources based on the resource needs of the host device(s) 102. The risk service provider 110 transmits the risk evaluation request 114 to the scoring component 112. It should be noted that the presently disclosed subject matter is not limited to the risk evaluation request 114 being generated or sent from the cloud computing server 116. For example, the host device(s) 102 may generate and transmit the risk evaluation request 114 to the scoring component 112.

As noted above, the risk service provider 110 is configured to provide risk scoring services. To determine a risk associated with the group(s) 108, the risk service provider 110 evaluates group data 118 against a risk model 120. A risk model component 122 applies the risk model 120 against the group data 118 to determine a risk score. The risk model 120 is generated by first deconstructing the group 108(1) into group attributes. The group attributes are logical collections of rules, capabilities, or functions associated with a particular group. For example, the group attributes of a security group may one or more rules that control traffic flow associated with the security group. In another example, the group attributes of roles in an organization may be specific roles, with each role being used to permit or exclude different capabilities. The risk model 120 can be more than one model used for different group types. For example, the risk model 120 can be a model generated for a certain type of security group. In another example, the risk model 120 can be a model generated for a certain collection of user types.

Once the group 108(1) is deconstructed into the group attributes, the group attributes are deconstructed into attribute categories. The attribute categories are used to identify various capabilities or functions associated with the specific group attribute. In the example provided above with regard to a security group, a group attribute may be PROTOCOL, and the attribute categories may be ANY, ICMP, TCP, and UDP, identifying the various types of communication protocols that may be used. An input component 124 is used to receive input indicating a risk value for each of the attribute categories of a particular group attribute. The risk value, in some examples, is a value from 0 to 1, with 0 indicating low risk and 1 indicating a high risk. The presently disclosed subject matter is not limited to any particular range of risk value used and can include any values in the range. For example, a risk value of an attribute category may be various values between 0 and 1, such as 0.50, 0.75 and other values. The input component 124 may receive an input about a risk value for an attribute category from a user (not shown) or other entity.

Once risk values 126 for the attribute categories are entered using the input component 124, the risk model 120 is generated using machine learning module 128. The scoring component 112 provides the risk values 126 to the machine learning module 128. The machine learning module 128 is a supervised machine learning component that receives the risk values 126 to generate an initial risk model. The initial risk model is an untrained model that is refined using a training process. The training process involves having the scoring component 112 inputting test data 130 into the initial risk model, whereby a risk score is determined. The test data 130 is configured to cause a risk model to generate a risk score within a predetermined range or value. If the initial risk model does not output a risk score of the test data within the range, the initial model is trained by either inputting new risk values 126, adjusting values within the risk model 120, or other methods. The test data 130 is reapplied to the risk model 120, whereby the risk model 120 is retrained by further input received at the input component 124 until the risk model outputs a risk score within a predetermined range or value, thus resulting in the risk model 120 that will be used by the scoring component 112.

Once the risk model 120 is trained, the scoring component 112 can use the risk model 120 to evaluate and determine a risk score for the group data 118. The group data 118 comprises information about each entity/user/object (collectively referred to hereinafter as "group objects") that form the group 108(1). The group data 118 includes the group attributes and attribute categories for each group object in the group 108(1). The scoring component 112 applies the group data 118 against the risk model 120 to generate a risk value for each of the group objects in the group 108(1). A recommendation component 132 can be used to identify which group objects may be a high risk group object. The recommendation component 132 can also be used to identify one or more attribute categories for the particular group object that may be causing a high risk value for the group object. Further, the recommendation component 132 can also provide one or more remedial actions, recommendation data, that may be taken, such as a recommendation to contain and isolate the group object(s) with a risk score above a predetermined value, e.g., high risk values, or modify policies, such as firewall polices.

Though depicted in FIG. 1 as separate components of the risk service provider 110, functionality associated with the scoring component 112, the risk model 120, the risk model component 122, the input component 124, the machine learning module 128, and the recommendation component 132 can be included in a different component of the service system, can be included in the host device(s) 102, and/or the computing device(s) 104. In some instances, the components described herein may comprise a pluggable component, such as a virtual machine, a container, a serverless function, etc., that is capable of being implemented in a service provider and/or in conjunction with any Application Program Interface (API) gateway.

Figure 2:
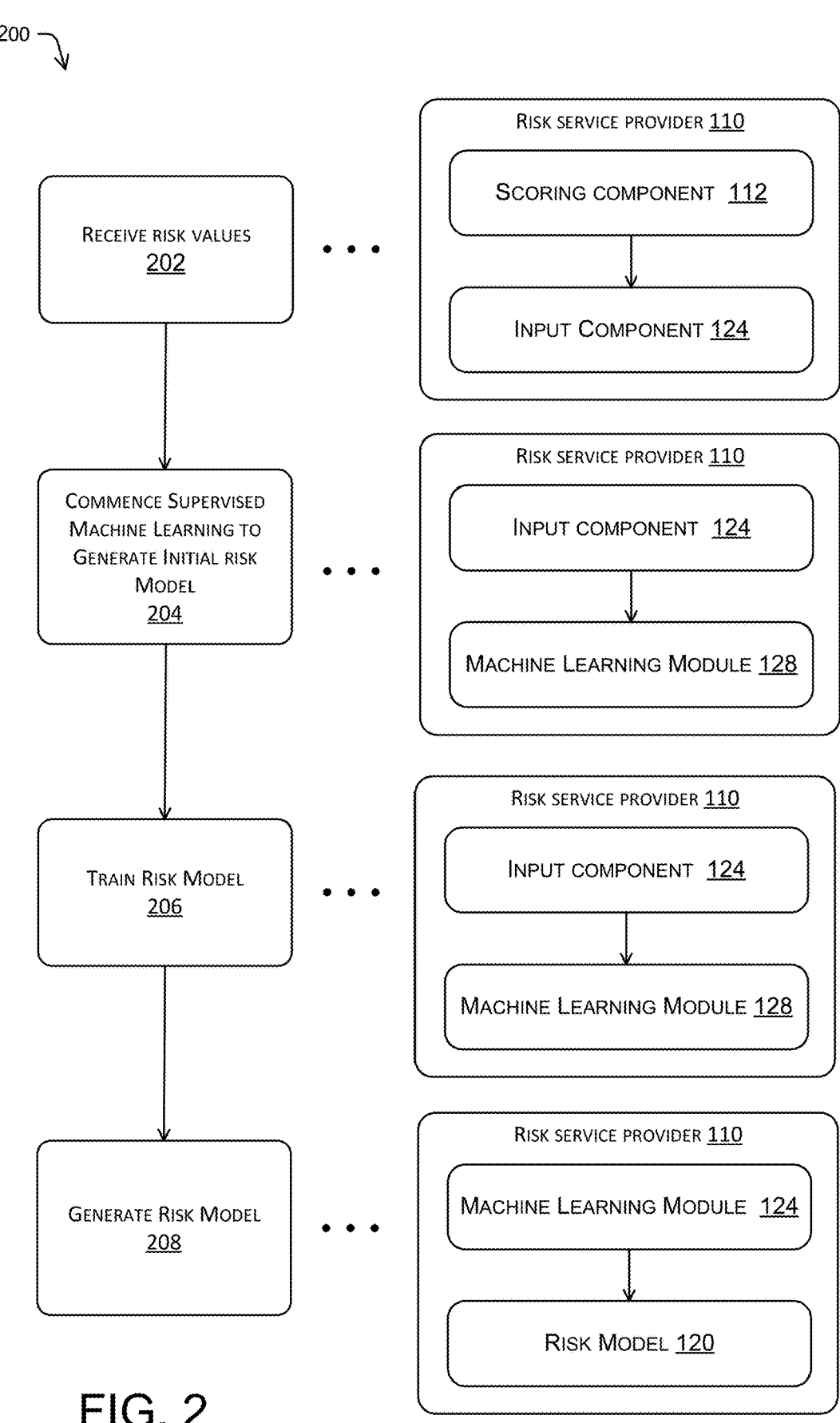
FIG. 2 is a pictorial diagram illustrating an example process to generate a risk model used to generate a risk score to identify potential security risks, as described herein.

FIG. 2 is a pictorial diagram illustrating an example process 200 to generate a risk model used to generate a risk score by one or more example components to protect a host device 102, as described herein. Once the risk model 120 is generated through the process 200, the risk model 120 is used to generate a risk value, described in more detail in FIG. 3, below. The example process 200 may be implemented by a computing device such as the risk service provider 110 of FIG. 1. The risk service provider 110 can implement the scoring component 112, the risk model 120, the risk model component 122, the input component 124, the machine learning module 128, and/or the recommendation component 132 to generate a risk value and recommendation for sending to device requesting a risk evaluation.

An operation 202 can include receiving at the scoring component 112 of the risk service provider 110 the risk values 126 associated with attribute categories of a group, such as the group 108(a) of the host device 102(1). The risk values 126 can be entered by one or more users or received from other inputs. The presently disclosed subject matter is not limited to any particular source of the risk values 126. The risk values 126 are a designation indicating a relative level of risk associated with a particular attribute category.

At operation 204, the input component 124 of the risk service provider 110 inputs the received risk values at operation 202 as well as the test data 130 to the machine learning module 128. The machine learning module 128 is configured to receive the risk values and generate an initial risk model. The test data 130 is entered into the initial risk model to generate an initial risk score. The test data 130 is configured to cause an output of a particular risk score either at a particular number or range of numbers indicating a relative risk. For example, the test data 130 may be configured to result in a risk score between 0.7 and 1.0 for particular group objects within the group of the test data 130. If the risk score is not allowable, i.e., within a range of risk score values, the process continues to operation 206.

At operation 206, the initial risk model is trained to generate a risk score for one or more group objects comprising the group of the test data 130 within an acceptable range or at an acceptable value. Thus, the input component 124 of the risk service provider 110 can receive an input from a user or other entity and provide that input to the machine learning module 128. The machine learning module 128 modifies the initial risk module and reperforms operation 204. The operations of 206 and 204 are repeated until the risk model outputs an allowable number or numerical value within a range of risk score for one or more group objects of the group in the test data 130. At operation 208, the trained risk model is provided by the machine learning module 128 and used as the risk model 120 to be applied to the group data 118, explained in more detail in FIG. 3.

Figure 3:
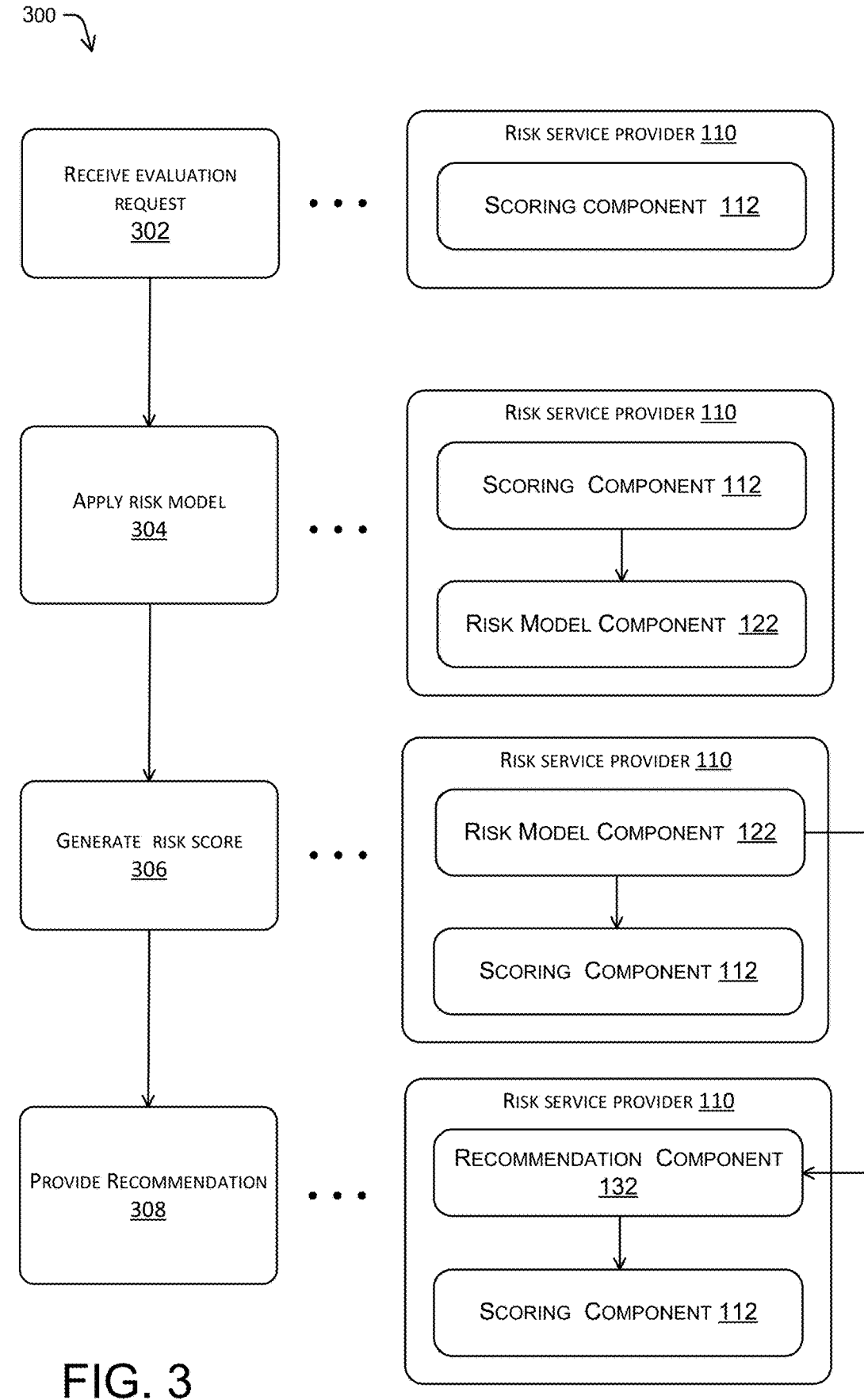
FIG. 3 is a pictorial diagram illustrating an example process to generate a risk score using a risk model to identify potential security risks, as described herein.

FIG. 3 is a pictorial diagram illustrating an example process 300 to generate a risk score using the risk model developed by the process 200. The example process 300 may be implemented by a computing device such as the risk service provider 110 of FIG. 1. The risk service provider 110 can implement the scoring component 112, the risk model 120, the risk model component 122, the input component 124, the machine learning module 128, and/or the recommendation component 132 to generate a risk value and recommendation for sending to device requesting a risk evaluation.

At operation 302, the risk evaluation request 114 is received at the scoring component 112 of the risk service provider 110. The risk evaluation request 114 in FIG. 1 is illustrated as being transmitted from the computing device(s) 104. However, as noted above, the presently disclosed subject matter is not limited to any particular source or origin for the risk evaluation request 114. For example, the risk service provider 110 may be contracted to provide risk evaluation services to the host device(s) 102 and, as part of the contract, may generate its own risk evaluation request 114. In another example, the host device(s) 102 may transmit the risk evaluation request 114 to monitor the group(s) 108. In a still further example, the risk evaluation request 114 may be generated and transmitted by a third-party entity not illustrated in FIG. 1. These and other examples are considered to be within the scope of the presently disclosed subject matter. The risk evaluation request 114 can include an identification of the requesting entity and an identification of the group. The information is used to determine which model to apply to the data to determine a risk score.

At operation 304, the scoring component 112 notifies the risk model component 122 that the risk evaluation request 114 was received and provides the risk evaluation request 114 to the risk model component 122. The risk model component 122 analyzes the risk evaluation request 114 and determines the group provided in the risk evaluation request 114 to determine which risk model to apply to the group data 118. In the present example, the risk model component 122 uses the risk model 120 trained to generate a risk score for a security group, which is the group 108(1).

At operation 306, the risk model component 122 generates a risk score using the risk model 120 selected based on the risk evaluation request 114 and the group data 118. The group data 118 can include the attribute values for one or more objects within the group 108(1). The risk score can be a numerical value representing a relative risk of an object of the group 108(1).

At operation 308, the recommendation component 132 receives the risk score from the risk model component 122 generated in operation 306. The recommendation component 132 can transmit to the scoring component 112 various operations, steps, or other information based on the risk score generated in operation 306. For example, the recommendation component 112 can identify objects in the group 108(1) that have a risk score above a predetermined value by highlighting or changing a visual representation of the risk score for the object. In another example, the recommendation component 112 can transmit a recommendation to the scoring component 112 to isolate one or more objects whose risk scores are above a predetermined value.

Figure 4:
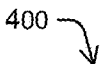
FIG. 4 is a flowchart depicting an example process for generating a risk score to evaluate a risk associated with objects of a group to identify potential security risks.

FIG. 4 is a flowchart depicting an example process 400 for generating a risk score to evaluate a risk associated with objects of a group. Some or all of the process 400 may be performed by one or more components in FIG. 1 or in operations described in FIG. 2 or 3.

At operation 402, the process 400 commences by receiving the risk evaluation request 114. As noted above, the presently disclosed subject matter is not limited to any particular source or origin for the risk evaluation request 114. For example, the risk service provider 110 may be contracted to provide risk evaluation services to the host device(s) 102 and, as part of the contract, may generate its own risk evaluation request 114. In another example, the host device(s) 102 may transmit the risk evaluation request 114 to monitor the group(s) 108. In a still further example, the risk evaluation request 114 may be generated and transmitted by a third-party entity not illustrated in FIG. 1. These and other examples are considered to be within the scope of the presently disclosed subject matter. The risk evaluation request 114 can include an identification of the requesting entity and an identification of the group. The information is used to determine which model to apply to the data to determine a risk score.

At operation 404, the process 400 can include determining the risk model to apply to the group data 118 associated with the risk evaluation request 114. As noted above, the risk service provider 110 may have more than one risk models 120 used to generate a risk score for objects of different types of groups. Further, the risk service provider 110 may have different risk models 120 to be used for the same group types. In this example, the risk model 120 may be based on a subscription service, different levels of risk value assigned to the attribute categories, and the like. For example, the subscription may include different levels or types of risk evaluations.

As note above, the risk model 120 is generated using supervised machine learning. In one example, an input is received for risk values 126 associated with attribute categories of a group. The risk values 126 are a designation indicating a relative level of risk associated with a particular attribute category of a group category. The machine learning module 128 generate an initial risk model and the test data 130 is entered into the initial risk model to generate an initial risk score. The initial risk model is trained to generate a risk score for one or more group objects comprising the group of the test data 130 within an acceptable or predetermined range or at an acceptable value. The training process is repeated until the risk model outputs an acceptable number or numerical value within a range of risk score for one or more group objects of the group in the test data 130.

At operation 406, the process 400 can apply the risk model to the group data 118 associated with the risk evaluation request 114. The group data 118 can include data about the attribute categories of the objects in the group, a group type, and the like.

At operation 408, the process 400 can generate a risk score for one or more objects of the group. The risk score can be a numerical value or other indicator that indicates a relative level of risk. For example, a score of 1.00 can be score representing a relatively high level of risk and a risk score of 0.20 can be a risk score representing a relatively lower level of risk. Other risk scores may be used, including the use of alphanumeric characters, and are considered to be within the scope of the presently disclosed subject matter. In some examples, the risk score represents the highest risk associated with an attribute category of an object. For example, while the object may have low risk for most attribute categories, the object may have a high risk for one of the attribute categories. Thus, the high risk attribute category may be outputted as the risk score for the object.

At operation 410, the scoring component 112 can provide the risk score to the entity that transmitted the risk evaluation request 114. In some examples, the scoring component 112 can also provide the risk score to the recommendation component 132 to generate one or more recommendations in response to the value of the risk score.

Figure 5:
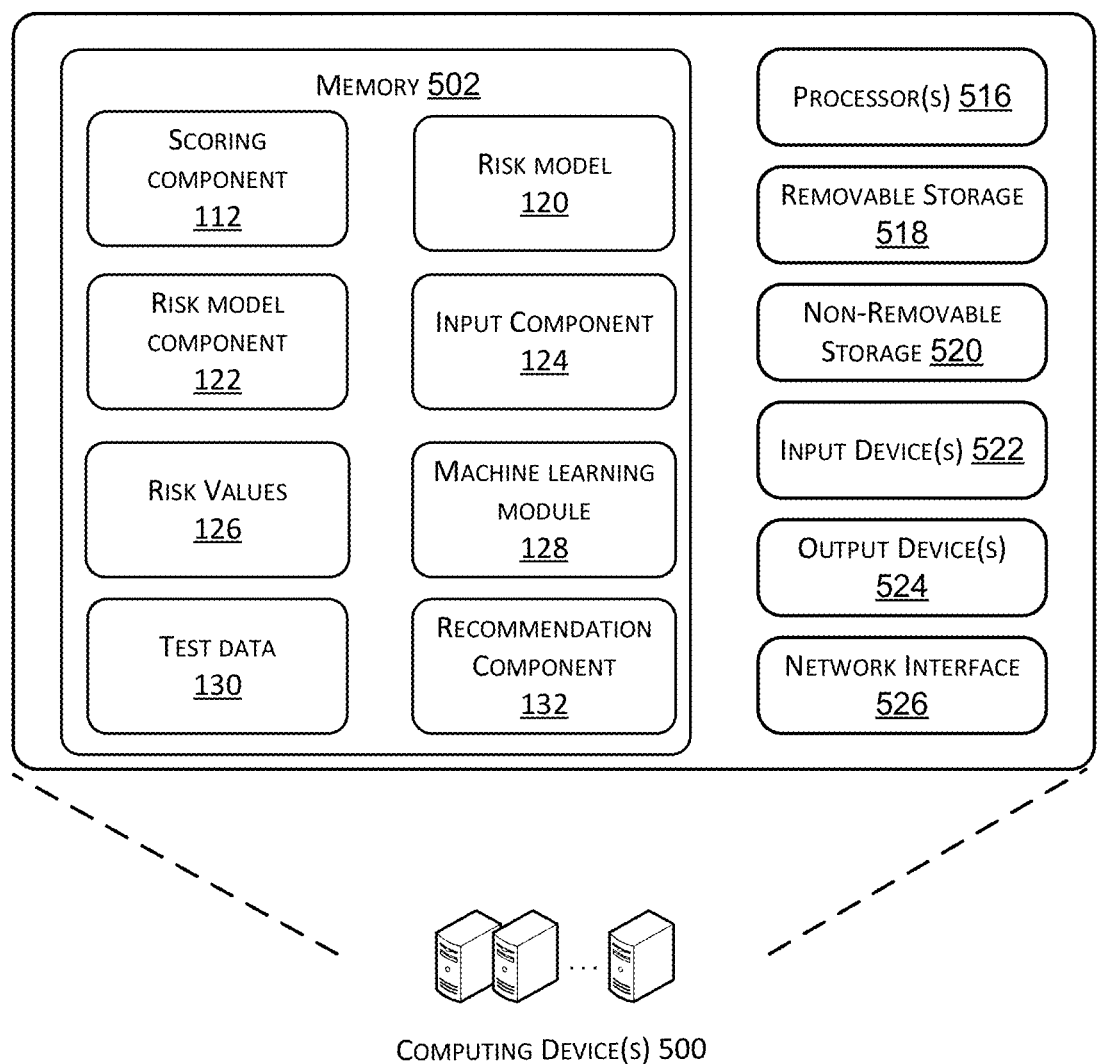
FIG. 5 is a block diagram of an illustrative computing architecture to implement the techniques describe herein.

FIG. 5 is a block diagram of computing device(s) 500 that may be used to implement various devices of the presently disclosed subject matter, such as the risk service provider 110 of FIG. 1. It is to be understood in the context of this disclosure that the computing device(s) 500 can be implemented as a single device or as a plurality of devices with components and data distributed among them. By way of example, and without limitation, the computing device(s) 500 can be implemented as various computing device 500 (1), 500(2), . . . , 500(N) where N is an integer greater than 1.

As illustrated, the computing device(s) 500 comprises a memory 502 storing the scoring component 112, the risk model 120, the risk model component 122, the input component 124, the risk values 126, the machine learning module 128, the test data 130, and the recommendation component 132. It should be understood that one or more of the components or data stored in the memory 502 may be stored in one or more computing device(s) including third-party computing devices. For example, the machine learning module 128 may be provided by a third-party service that provides machine learning services to the risk service provider 110. Also, the computing device(s) 500 includes processor(s) 516, a removable storage 518 and non-removable storage 520, input device(s) 522, output device(s) 524, and network interface 526.

In various embodiments, memory 502 is volatile (such as RAM), non-volatile (such as ROM, flash memory, etc.) or some combination of the two. The scoring component 112, the risk model 120, the risk model component 122, the input component 124, the risk values 126, the machine learning module 128, the test data 130, and the recommendation component 132 stored in the memory 502 can comprise methods, threads, processes, applications or any other sort of executable instructions. The scoring component 112, the risk model 120, the risk model component 122, the input component 124, the risk values 126, the machine learning module 128, the test data 130, and the recommendation component 132 can also include files and databases.

In various embodiments, the computer-readable memory 502 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 502 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 502 may be part of the security service system. In some instances, any or all of the devices and/or components of the computing device(s) 500 may have features or functionality in addition to those that FIG. 5 illustrates. For example, some or all of the functionality described as residing within any or all of the computing device(s) 500 may reside remotely from that/those computing device(s) 500, in some implementations.

The computing device(s) 500 may be configured to communicate over a telecommunications network using any common wireless and/or wired network access technology. Moreover, the computing device(s) 500 may be configured to run any compatible device operating system (OS), including but not limited to, Microsoft Windows Mobile, Google Android, Apple iOS, Linux Mobile, as well as any other common mobile device OS.

The computing device(s) 500 also can include input device(s) 522, such as a keypad, a cursor control, a touch-sensitive display, voice input device, etc., and output device(s) 524 such as a display, speakers, printers, etc. These devices are well known in the art and need not be discussed at length here.

As illustrated in FIG. 5, the computing device(s) 500 also includes the network interface 526 that enables the computing device(s) 500 of the security service system to communicate with other computing devices, such as any or all of the host device(s) 102.

FIGS. 2, 3, and 4 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 3 may omit operation 308.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the process 400 may omit operation 410. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving a risk evaluation request to provide a first risk score for a first object of a group and second risk score for a second object of the group;
selecting an initial risk model to generate a trained risk model, wherein the trained risk model is used to generate the first risk score and the second risk score, wherein the trained risk model is generated by:
deconstructing the group into group attributes;
deconstructing the group attributes into attribute categories;
receiving a risk value for each of the attribute categories; and
generating the trained risk model by training the initial risk model, wherein training the initial risk model comprises modifying the initial risk model until training data applied to the risk model using a machine learning module generates an allowable risk score for a test group object of the training data;
generating the first risk score and the second risk score using the trained risk model; and
configuring recommendation data for the group based at least in part on the first risk score or the second risk score, the recommendation data comprising an indication of a high risk associated with the first risk score or the second risk score.

2. The system of claim 1, wherein the group comprises a security group and the group attributes comprise rules that control a traffic flow associated with the security group.

3. The system of claim 1, wherein selecting the initial risk model comprises analyzing the risk evaluation request to determine a group type associated with the risk evaluation request.

4. The system of claim 1, wherein selecting the initial risk model comprises determining a type of subscription service associated with the risk evaluation request.

5. The system of claim 1, wherein the allowable risk score for the test group object of the training data comprises a numerical value within a predetermined range of numerical values.

6. The system of claim 1, wherein receiving an input of the risk value for each of the attribute categories comprises receiving an input from a user at an input component.

7. One or more non-transitory computer-readable media storing instructions executable by one or more processors, wherein the instructions, when executed, cause the one or more processors to perform operations comprising:
receiving a risk evaluation request to provide a first risk score for a first object of a group and second risk score for a second object of the group;
applying an initial risk model to generate a trained risk model, wherein the trained risk model is used to generate the first risk score and the second risk score, wherein the trained risk model is generated by:
deconstructing the group into group attributes;
deconstructing the group attributes into attribute categories;
receiving an input of a risk value for each of the attribute categories; and
generating trained the risk model by training the initial risk model, wherein training the initial risk model comprises modifying the initial risk model until training data applied to the risk model using a machine learning module generates an allowable risk score for a test group object of the training data;
generating the first risk score and the second risk score using the trained risk model; and
configuring recommendation data for the group based at least in part on the first risk score or the second risk score, the recommendation data comprising an indication of a high risk associated with the first risk score or the second risk score.

8. The one or more non-transitory computer-readable media of claim 7, wherein the group comprises a security group and the group attributes comprise rules that control a traffic flow associated with the security group.

9. The one or more non-transitory computer-readable media of claim 7, wherein selecting the initial risk model comprises analyzing the risk evaluation request to determine a group type associated with the risk evaluation request.

10. The one or more non-transitory computer-readable media of claim 7, wherein selecting initial the risk model comprises determining a type of subscription service associated with the risk evaluation request.

11. The one or more non-transitory computer-readable media of claim 7, wherein the allowable risk score for the test group object of the training data comprises a numerical value within a predetermined range of numerical values.

12. The one or more non-transitory computer-readable media of claim 7, wherein receiving the input of the risk value for each of the attribute categories comprises receiving an input from a user at an input component.

13. The one or more non-transitory computer-readable media of claim 7, wherein the risk value for each of the attribute categories comprises a numerical value between 0 and 1.

14. The one or more non-transitory computer-readable media of claim 7, wherein the recommendation data comprises a recommendation to isolate a group object having a risk score above a predetermined value.

15. The one or more non-transitory computer-readable media of claim 7, wherein the machine learning module uses a neural network regression algorithm.

16. The one or more non-transitory computer-readable media of claim 7, wherein the risk evaluation request is received from a cloud computing server providing cloud computing services to a host device providing computing services to the group or received from the host device providing the computing services to the group.

17. A computer-implemented method comprising:
receiving a risk evaluation request to provide a first risk score for a first object of a group and second risk score for a second object of the group;
applying an initial risk model to generate a trained risk model, wherein the trained risk model is used to generate the first risk score and the second risk score, wherein the trained risk model is generated by:
deconstructing the group into group attributes;
deconstructing the group attributes into attribute categories;
receiving an input of a risk value for each of the attribute categories; and
generating the trained risk model by training the initial risk model, wherein training the risk model comprises modifying the initial risk model until training data applied to the risk model using a machine learning module generates an allowable risk score for a test group object of the training data;
generating the first risk score and the second risk score using the trained risk model; and
configuring recommendation data for the group based at least in part on the first risk score or the second risk score, the recommendation data comprising an indication of a high risk associated with the first risk score or the second risk score.

18. The computer-implemented method of claim 17, wherein selecting the initial risk model comprises analyzing the risk evaluation request to determine a group type associated with the risk evaluation request or determining a type of subscription service associated with the risk evaluation request.

19. The computer-implemented method of claim 17, wherein the allowable risk score for the test group object of the training data comprises a numerical value within a predetermined range of numerical values.

20. The computer-implemented method of claim 17, wherein receiving the input of the risk value for each of the attribute categories comprises receiving an input from a user at an input component.

* * * * *